US012126913B2

(12) United States Patent
Hassani

(10) Patent No.: US 12,126,913 B2
(45) Date of Patent: Oct. 22, 2024

(54) ILLUMINATION CONTROL FOR VEHICLE SENSORS

(71) Applicant: Ford Global Technologies, LLC, Dearborn, MI (US)

(72) Inventor: Ali Hassani, Ann Arbor, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 15 days.

(21) Appl. No.: 17/866,875

(22) Filed: Jul. 18, 2022

(65) Prior Publication Data

US 2024/0022826 A1 Jan. 18, 2024

(51) Int. Cl.
| | |
|---|---|
| *H04N 23/74* | (2023.01) |
| *B60Q 3/20* | (2017.01) |
| *B60Q 3/70* | (2017.01) |
| *B60R 25/01* | (2013.01) |
| *B60R 25/25* | (2013.01) |
| *G06V 20/59* | (2022.01) |
| *G06V 40/16* | (2022.01) |
| *H04N 23/56* | (2023.01) |

(52) U.S. Cl.
CPC .............. *H04N 23/74* (2023.01); *B60Q 3/20* (2017.02); *B60Q 3/70* (2017.02); *B60R 25/01* (2013.01); *B60R 25/25* (2013.01); *G06V 20/597* (2022.01); *G06V 40/161* (2022.01); *H04N 23/56* (2023.01)

(58) Field of Classification Search
CPC .......... H04N 23/74; H04N 23/56; B60Q 3/20; B60Q 3/70; B60R 25/01; B60R 25/25; G06V 20/597; G06V 40/161
See application file for complete search history.

(56) References Cited

U.S. PATENT DOCUMENTS

| | | | |
|---|---|---|---|
| 8,761,594 B1 * | 6/2014 | Gross ................... | G01S 7/4817 396/155 |
| 10,579,867 B2 | 3/2020 | Foltin | |
| 10,949,647 B2 | 3/2021 | Hicks et al. | |
| 11,068,701 B2 | 7/2021 | Zhang et al. | |
| 2010/0290774 A1 * | 11/2010 | Matsuoka .............. | B60Q 1/247 362/11 |
| 2018/0111553 A1 * | 4/2018 | Kubota .................. | G06V 20/56 |
| 2020/0305784 A1 * | 10/2020 | Van Bree ............... | G06V 10/60 |

(Continued)

FOREIGN PATENT DOCUMENTS

WO 2017123702 A1 7/2017

*Primary Examiner* — Tat C Chio
(74) *Attorney, Agent, or Firm* — Christopher Storms; Bejin Bieneman PLC

(57) ABSTRACT

A system includes an illumination source operable at an adjustable duty cycle, a camera arranged to detect illumination from the illumination source, and a computer communicatively coupled to the illumination source and the camera. The duty cycle indicates a proportion of time that the illumination source is illuminated in a repeating pattern. The computer is programmed to operate the illumination source with the duty cycle at a baseline duty cycle in response to failing to detect an object having a preset type in image data from the camera, and operate the illumination source with the duty cycle at a high duty cycle in response to detecting the object having the preset type in the image data from the camera. The high duty cycle has the illumination source illuminated for a greater proportion of time than the baseline duty cycle.

18 Claims, 4 Drawing Sheets

(56) References Cited

U.S. PATENT DOCUMENTS

| | | | | |
|---|---|---|---|---|
| 2020/0394390 A1* | 12/2020 | Zhang | .................... | H04N 23/56 |
| 2022/0281317 A1* | 9/2022 | Ahn | ...................... | B60W 40/08 |
| 2023/0342909 A1* | 10/2023 | Hyatt | ..................... | H04N 23/74 |

* cited by examiner

ILLUMINATION CONTROL FOR VEHICLE SENSORS

BACKGROUND

Vehicles are often equipped with cameras. The cameras detect electromagnetic radiation in some range of wavelengths. The wavelengths can be visible light, infrared radiation, ultraviolet light, or some range of wavelengths including visible, infrared, and/or ultraviolet light. Types of cameras include image sensors such as charge-coupled devices (CCD), active-pixel sensors such as complementary metal-oxide semiconductor (CMOS) sensors, etc.

For situations in which the ambient environment is insufficiently illuminated for the cameras, vehicles are equipped with illumination sources. The illumination sources are arranged to illuminate areas in the fields of view of the cameras. The cameras thereby receive illumination from the illumination sources reflected from features of the environment.

DETAILED DESCRIPTION

Figure 1:
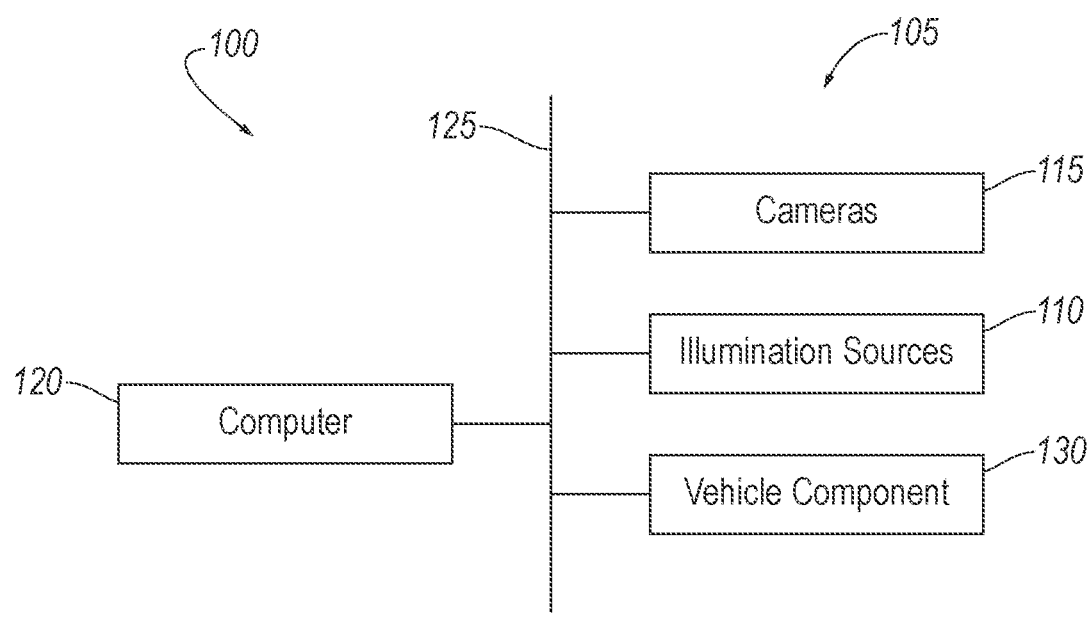
FIG. 1 is a block diagram of an example vehicle.

The system described herein pertains to a camera with an illumination source Image data from the camera may be used for various determinations with respect to a scene, e.g., biometric authentication such as facial recognition, detection of gaze direction, determination of drowsiness or emotional state, etc. These determinations can be used for actuating a component, e.g., unlocking a lock of a vehicle door upon a successful biometric authentication while the vehicle is stationary. These determinations can benefit from illumination of a subject as well as from determining an ambient illumination, i.e., an illumination level of an environment excluding illumination from the illumination source. The illumination source is operable at a duty cycle, which dictates a proportion of time that the illumination source is illuminated in a repeating pattern. Frames of the image data in which the illumination source is illuminated may be used directly for the determinations, and frames of the image data in which the illumination source is unilluminated may be used for determining the ambient illumination.

The techniques discussed herein provide a time-efficient way to make one of the determinations from the image data. The techniques can minimize frame loss, i.e., a number of frames that are discarded when switching the illumination source between illuminated and unilluminated. The duty cycle of the illumination source is adjustable, and a computer communicatively coupled to the illumination source and the camera is programmed to operate the illumination source with the duty cycle at a baseline duty cycle in response to failing to detect an object having a preset type in image data from the camera, and to operate the illumination source with the duty cycle at a high duty cycle in response to detecting the object having the preset type in the image data from the camera. The preset type of object is the type on which one of the determinations may be performed. The high duty cycle has the illumination source illuminated for a greater proportion of time than the baseline duty cycle. Selectively switching between the baseline duty cycle and the high duty cycle both provides recent unilluminated frames, thereby minimizing frame loss, and provides sufficient illuminated frames for making one of the determinations.

A system includes an illumination source operable at an adjustable duty cycle, a camera arranged to detect illumination from the illumination source, and a computer communicatively coupled to the illumination source and the camera. The duty cycle indicates a proportion of time that the illumination source is illuminated in a repeating pattern. The computer is programmed to operate the illumination source with the duty cycle at a baseline duty cycle in response to failing to detect an object having a preset type in image data from the camera, and operate the illumination source with the duty cycle at a high duty cycle in response to detecting the object having the preset type in the image data from the camera. The high duty cycle has the illumination source illuminated for a greater proportion of time than the baseline duty cycle.

The illumination source may be configured to produce illumination outside a visible range. The illumination source may be configured to produce infrared illumination.

The system may further include a component communicatively coupled to the computer, and the computer may be further programmed to actuate the component based on the image data captured when the illumination source is illuminated.

A computer includes a processor and a memory, and the memory stores instructions executable by the processor to operate an illumination source with a duty cycle at a baseline duty cycle in response to failing to detect an object having a preset type in image data from a camera, and operate the illumination source with the duty cycle at a high duty cycle in response to detecting the object having the preset type in the image data from the camera. The duty cycle indicates a proportion of time that the illumination source is illuminated in a repeating pattern. The camera is arranged to detect illumination from the illumination source. The high duty cycle has the illumination source illuminated for a greater proportion of time than the baseline duty cycle.

The preset type may be a face.

The instructions may further include instructions to store a most recent unilluminated image frame from the image data in a buffer, and the most recent unilluminated image frame may be captured when the illumination source is unilluminated. The instructions may further include instructions to compensate for ambient illumination in an illuminated image frame from the image data by using the most recent unilluminated image frame. The instructions may further include instructions to, after compensating for the ambient illumination, determine a characteristic of the object in the illuminated image frame. Determining the characteristic may include performing a biometric authentication of the object.

Determining the characteristic may include detecting a gaze direction.

The instructions may further include instructions to actuate a component based on the characteristic. The component may be a vehicle component of a vehicle including the computer.

The instructions may further include instructions to, upon storing the most recent unilluminated image frame in the buffer, delete a previous most recent unilluminated image frame from the buffer.

The instructions may further include instructions to, in response to the image data satisfying a criterion, temporarily de-illuminate the illumination source. Temporarily de-illuminating the illumination source may be a deviation from the duty cycle of the illumination source.

The criterion may include a change in average brightness of the image data greater than a threshold.

The object may be a first object, and the criterion may include detecting a second object of the preset type.

The instructions may further include instructions to store a most recent unilluminated image frame from the image data in a buffer, and the most recent unilluminated image frame may be captured when temporarily de-illuminating the illumination source.

A method includes operating an illumination source with a duty cycle at a baseline duty cycle in response to failing to detect an object having a preset type in image data from a camera, and operating the illumination source with the duty cycle at a high duty cycle in response to detecting the object having the preset type in the image data from the camera. The duty cycle indicates a proportion of time that the illumination source is illuminated in a repeating pattern. The camera is arranged to detect illumination from the illumination source. The high duty cycle has the illumination source illuminated for a greater proportion of time than the baseline duty cycle.

With reference to the Figures, wherein like numerals indicate like parts throughout the several views, a system 105 includes an illumination source 110 operable at an adjustable duty cycle, a camera 115 arranged to detect illumination from the illumination source 110, and a computer 120 communicatively coupled to the illumination source 110 and the camera 115. The duty cycle indicates a proportion of time that the illumination source 110 is illuminated in a repeating pattern. The computer 120 is programmed to operate the illumination source 110 with the duty cycle at a baseline duty cycle 305 in response to failing to detect an object having a preset type in image data 400 from the camera 115, and operate the illumination source 110 with the duty cycle at a high duty cycle 310 in response to detecting the object having the preset type in the image data 400 from the camera 115. The high duty cycle 310 has the illumination source 110 illuminated for a greater proportion of time than the baseline duty cycle 305.

With reference to FIG. 1, the system 105 may be included in a vehicle 100. The vehicle 100 may be any passenger or commercial automobile such as a car, a truck, a sport utility vehicle, a crossover, a van, a minivan, a taxi, a bus, etc.

The computer 120 is a microprocessor-based computing device, e.g., a generic computing device including a processor and a memory, an electronic controller or the like, a field-programmable gate array (FPGA), an application-specific integrated circuit (ASIC), a combination of the foregoing, etc. Typically, a hardware description language such as VHDL (VHSIC (Very High Speed Integrated Circuit) Hardware Description Language) is used in electronic design automation to describe digital and mixed-signal systems such as FPGA and ASIC. For example, an ASIC is manufactured based on VHDL programming provided pre-manufacturing, whereas logical components inside an FPGA may be configured based on VHDL programming, e.g., stored in a memory electrically connected to the FPGA circuit. The computer 120 can thus include a processor, a memory, etc. The memory of the computer 120 can include media for storing instructions executable by the processor as well as for electronically storing data and/or databases, and/or the computer 120 can include structures such as the foregoing by which programming is provided. The computer 120 can be multiple computers coupled together.

The computer 120 may transmit and receive data through a communications network 125 such as a controller area network (CAN) bus, Ethernet, WiFi, Local Interconnect Network (LIN), onboard diagnostics connector (OBD-II), and/or by any other wired or wireless communications network. The computer 120 may be communicatively coupled to the cameras 115, the illumination sources 110, and other vehicle components 130 via the communications network 125.

The cameras 115 detect electromagnetic radiation in some range of wavelengths. For example, the cameras 115 may detect visible light, infrared radiation, ultraviolet light, or some range of wavelengths including visible, infrared, and/or ultraviolet light. For example, the cameras 115 can include image sensors such as charge-coupled devices (CCD), active-pixel sensors such as complementary metal-oxide semiconductor (CMOS) sensors, etc. The cameras 115 are configured to detect illumination from respective illumination sources 110; i.e., the range of wavelengths of electromagnetic radiation detectable by the camera 115 completely or significantly overlap the range of wavelengths produced by the respective illumination source 110.

The illumination sources 110 can produce illumination in some range of wavelengths, specifically, illumination detectable by the cameras 115. For example, the illumination sources 110 may produce visible light, infrared radiation, ultraviolet light, or some range of wavelengths including visible, infrared, and/or ultraviolet light. The illumination sources 110 are configured to produce illumination in a range of wavelengths completely or significantly encompassed by the range of wavelengths detectable by the cameras 115. For example, the illumination sources 110 can produce and the cameras 115 can detect illumination outside a visible range, e.g., infrared illumination, e.g., near-infrared illumination (700-1300 nanometers (nm)). The illumination sources 110 can be any suitable types for producing the desired wavelengths, e.g., for visible light, tungsten, halogen, high-intensity discharge (HID) such as xenon, light-emitting diodes (LED), etc.; for infrared light, LEDs, lasers, filtered incandescent, etc.

Figure 2:
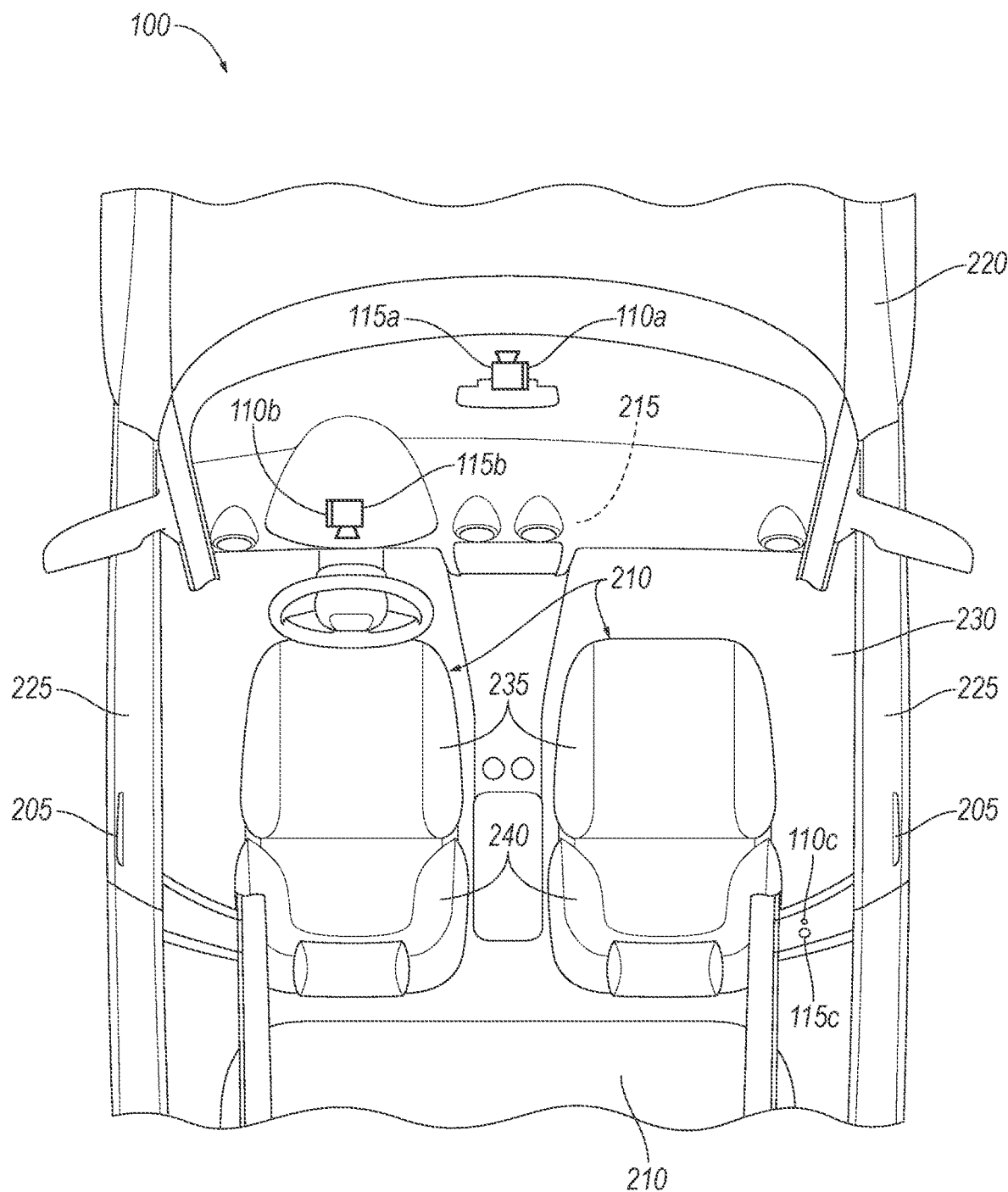
FIG. 2 is a top diagrammatic view of the vehicle with a passenger cabin exposed for illustration.

The system 105 includes the vehicle components 130 that are actuatable by the computer 120 in response to image data 400 from the cameras 115, as described below. Examples of vehicle components 130 include door locks 205, seats 210, a climate-control system 215, etc., as shown in FIG. 2 and described in detail below. Other vehicle components 130 besides these examples can be actuatable by the computer 120 in response to image data 400 from the cameras 115.

With reference to FIG. 2, the vehicle 100 includes a body 220. The vehicle 100 may be of a unibody construction, in which a frame and the body 220 of the vehicle 100 are a single component. The vehicle 100 may, alternatively, be of a body-on-frame construction, in which the frame supports the body 220 that is a separate component from the frame. The frame and the body 220 may be formed of any suitable material, for example, steel, aluminum, etc.

The door locks 205 are engageable to permit or prevent doors 225 of the vehicle 100 from being opened. The door locks 205 are movable between a disengaged position, in which the doors 225 are unlocked, i.e., permitted to open if the door handle is operated, and an engaged position, in which the doors 225 are locked, i.e., prevented from opening even if the door handle is operated.

The vehicle 100 includes a passenger cabin 230 to house occupants, if any, of the vehicle 100. The passenger cabin 230 includes one or more of the seats 210 disposed in a front row of the passenger cabin 230 and one or more of the seats 210 disposed in a second row behind the front row. The passenger cabin 230 may also include third-row seats 210 (not shown) at a rear of the passenger cabin 230. In FIG. 2, the front-row seats 210 are shown to be bucket seats and the rear seats 210 are shown to be a bench seat, but the seats 210 may be other types. The position and orientation of the seats 210 and components thereof may be adjustable by an occupant.

Each seat 210 can include actuators for adjusting the seat 210 in multiple degrees of freedom, e.g., a tilt of the seat 210, a height of the seat 210, a recline angle of the seat 210, or a lumbar support position of the seat 210. The tilt of the seat 210 is an angle of a seat bottom 235 of the seat 210 relative to the passenger cabin 230 about a lateral axis, i.e., a pitch of the seat bottom 235. The height of the seat 210 is a vertical distance of a reference point on the seat bottom 235 relative to the passenger cabin 230. The recline angle of the seat 210 is an angle of a seat back 240 of the seat 210 relative to the seat bottom 235. The lumbar support position is a vehicle-forward position of a lumbar support bar (not shown), located in the seat back 240, relative to the seat back 240. Additionally or alternatively, the seat 210 may be adjustable in other degrees of freedom.

The climate-control system 215 provides heating and/or cooling to the passenger cabin 230 of the vehicle 100. The climate-control system 215 may include a compressor, a condenser, a receiver-dryer, a thermal-expansion valve, an evaporator, blowers, fans, ducts, vents, vanes, temperature sensors, and other components that are known for heating or cooling vehicle interiors. The climate-control system 215 may operate to cool the passenger cabin 230 by transporting a refrigerant through a heat cycle to absorb heat from the passenger cabin 230 and expel the heat from the vehicle 100, as is known. The climate-control system 215 may include a heater core that operates as a radiator for an engine of the vehicle 100 by transferring some waste heat from the engine into the passenger cabin 230, as is known. The climate-control system 215 may include an electrically powered heater such as a resistive heater, positive-temperature-coefficient heater, electrically powered heat pump, etc.

The cameras 115 are typically arranged in positions to detect persons in the vicinity of the vehicle 100, e.g., occupants and/or pedestrians. For example, the cameras 115 can include a first camera 115a with a field of view encompassing an area in front of the vehicle 100. The first camera 115a can be mounted on or above a rear-view mirror and aimed in a vehicle-forward direction. For another example, the cameras 115 can include a second camera 115b with a field of view encompassing an operator of the vehicle 100. The second camera 115b can be mounted to an instrument panel and aimed in a vehicle-rearward direction. The second camera 115b can be arranged to include one or more occupants, e.g., only the operator, or all the occupants, etc., of the passenger cabin 230. For another example, the cameras 115 can include a third camera 115c with a field of view encompassing an area next to the doors 225 of the vehicle 100. The third camera 115c can be mounted to a B-pillar of the vehicle 100 and aimed in a vehicle-lateral direction. A person approaching the door 225 will be in the field of view of the third camera 115c.

The illumination sources 110 are arranged to produce illumination detectable by the cameras 115, and likewise the cameras 115 are arranged to detect illumination from the illumination sources 110. Specifically, the illumination sources 110 are arranged to illuminate areas in the fields of view of the cameras 115, and the cameras 115 are arranged so that the fields of view of the cameras 115 encompass areas illuminated by the illumination sources 110. The cameras 115 thereby receive illumination from the illumination sources 110 that has reflected off of features of the environment. For example, the illumination sources 110 can each be mounted to a respective one of the cameras 115 and aimed in the same direction as that camera 115. The respective pairings of illumination sources 110 and cameras 115 can be packaged as a single unit. The illumination sources 110 can include a first illumination source 110a mounted to the first camera 115a, a second illumination source 110b mounted to the second camera 115b, a third illumination source 110c mounted to the third camera 115c, and so on.

Figure 3:
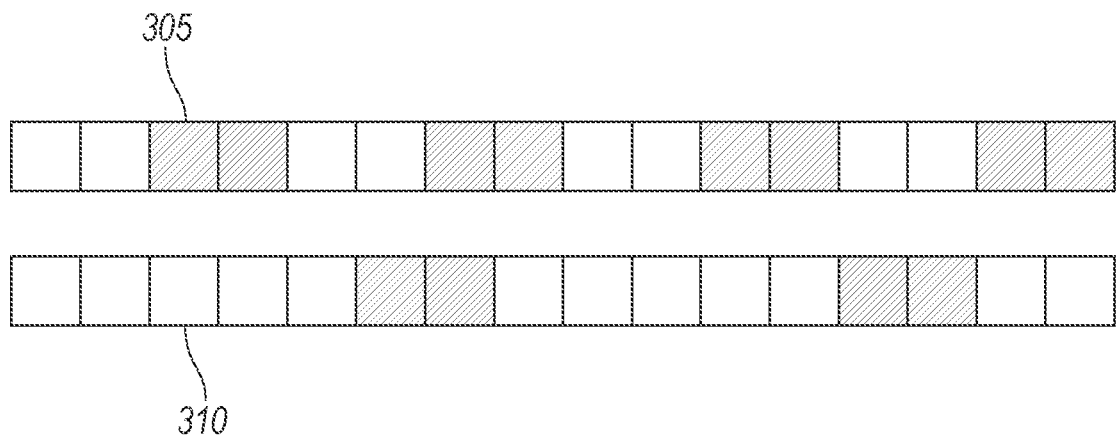
FIG. 3 is a diagram of example duty cycles of an illumination source of the vehicle.

With reference to FIG. 3, the illumination sources 110 are each operable at a respective duty cycle. A duty cycle indicates a proportion of time that the illumination source 110 is illuminated in a repeating pattern. In FIG. 3, unshaded blocks represent units of time in which the illumination source 110 is illuminated, and shaded blocks represent units of time in which the illumination source 110 is unilluminated. For each repetition of the pattern, the illumination source 110 is illuminated for a first number of units of time and is unilluminated for a second number of units of time. The proportion of time that the illumination source 110 is illuminated is thus the first number of units of time divided by the sum of the first and second numbers of units of time. The units of time may correspond to a frame rate of the respective camera 115, e.g., the unit of time may be the time to capture one frame of image data 400. The illumination source 110 may be synchronized with the camera 115, or be unsynchronized.

The duty cycle may be adjustable, e.g., in response to receiving a command from the computer 120. For example, the duty cycle may be adjustable between a plurality of preset duty cycles. The preset duty cycles may include the baseline duty cycle 305 and the high duty cycle 310, as well as possibly other duty cycles. The high duty cycle 310 has the illumination source 110 illuminated for a greater proportion of time than the baseline duty cycle 305, e.g., the high duty cycle 310 may have the illumination source 110 illuminated for five units of time out of seven, and the baseline duty cycle 305 may have the illumination source 110 illuminated for two units of time out of four, as shown in FIG. 3. For another example, the high duty cycle 310 may be continuously illuminated, and the baseline duty cycle 305 may be illuminated for some fraction of the time.

Figure 4:
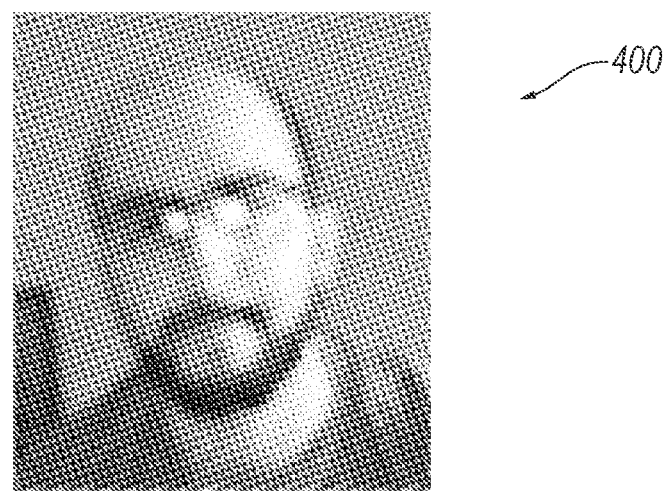
FIG. 4 depicts an example frame of image data from a camera of the vehicle.

With reference to FIG. 4, the cameras 115 generate image data 400 of the respective fields of view of the cameras 115. The image data 400 are a sequence of image frames of the fields of view of the respective cameras 115. FIG. 4 shows an example image frame of a person's face. Each image frame is a two-dimensional matrix of pixels. Each pixel has a brightness or color represented as one or more numerical values, e.g., a scalar unitless value of photometric light intensity between 0 (black) and 1 (white), or values for each of red, green, and blue, e.g., each on an 8-bit scale (0 to 255) or a 12- or 16-bit scale. The pixels may be a mix of representations, e.g., a repeating pattern of scalar values of intensity for three pixels and a fourth pixel with three numerical color values, or some other pattern. For example, FIG. 4 is an image frame in which each pixel is a scalar value of intensity of illumination in near-infrared wavelengths. Position in an image frame, i.e., position in the field of view of the camera 115 at the time that the image frame was recorded, can be specified in pixel dimensions or coordinates, e.g., an ordered pair of pixel distances, such as a number of pixels from a top edge and a number of pixels from a left edge of the field of view.

The image data 400 can be of objects that are in the field of view of one of the cameras 115. The objects can be classified into types. For example, one such type of object is a face, as shown in FIG. 4. Other types may include a retina, a palm, etc.

The computer 120 may be programmed to detect whether an object of a preset type is in the image data 400, e.g., a face, a retina, a palm, etc. For example, the computer 120 can detect the type of object using conventional image-recognition techniques, e.g., a convolutional neural network programmed to accept images as input and output an identified type. A convolutional neural network includes a series of layers, with each layer using the previous layer as input. Each layer contains a plurality of neurons that receive as input data generated by a subset of the neurons of the previous layers and generate output that is sent to neurons in the next layer. Types of layers include convolutional layers, which compute a dot product of a weight and a small region of input data; pool layers, which perform a downsampling operation along spatial dimensions; and fully connected layers, which generate based on the output of all neurons of the previous layer. The final layer of the convolutional neural network generates a score for each potential type, and the final output is the type with the highest score. If the highest score belongs to the preset type, then the computer 120 has detected the object of the preset type.

For another example, if the preset type is a face, the computer 120 may detect the face using facial detection. The computer 120 can detect the face in the image data 400 by using any suitable facial-detection technique, e.g., knowledge-based techniques such as a multiresolution rule-based method; feature-invariant techniques such as grouping of edges, space gray-level dependence matrix, or mixture of Gaussian; template-matching techniques such as shape template or active shape model; or appearance-based techniques such as eigenface decomposition and clustering, Gaussian distribution and multilayer perceptron, neural network, support vector machine with polynomial kernel, a naive Bayes classifier with joint statistics of local appearance and position, higher order statistics with hidden Markov model, or Kullback relative information.

The computer 120 may be programmed to select one of the preset duty cycles for the illumination source 110 based on whether the computer 120 detected an object having the preset type in the image data 400. For example, the computer 120 may select the baseline duty cycle 305 in response to failing to detect an object having the preset type in the image data 400 from the camera 115, and the computer 120 may select the high duty cycle 310 in response to detecting an object having the preset type in the image data 400 from the camera 115.

The computer 120 may be programmed to operate the illumination source 110 with the duty cycle at the selected duty cycle, e.g., the baseline duty cycle 305 or high duty cycle 310. The computer 120 may transmit a command indicating the selected duty cycle to the illumination source 110 via the communications network 125.

The computer 120 may be programmed to determine whether a criterion is satisfied for temporarily de-illuminating the illumination source 110 (as described below). The criterion can be chosen to indicate that the ambient illumination may need to be recalculated (as described below). For example, the criterion may include a change in average brightness of the image data 400 greater than a threshold. The computer 120 may determine the average brightness by summing intensity values for the pixels in an image frame and dividing by the number of pixels in the image frame. The threshold may be chosen to encompass changes in average brightness resulting from events such as cloud cover crossing the sun, a floodlight being turned on in the vicinity of the vehicle 100, etc. For another example, the criterion may include detecting a second object of the preset type, e.g., simultaneous with the original object still being present. The computer 120 may detect the second object in the same manner as detecting the original object described above.

The computer 120 may be programmed to temporarily de-illuminate the illumination source 110, e.g., in response to the criterion being satisfied. Temporarily de-illuminating the illumination source 110 includes putting the illumination source 110 in an unilluminated condition for a prespecified time period. The prespecified time period can be a small number of frames at the frame rate of the camera 115, e.g., no more than five frames. The illumination source 110 may be illuminated or unilluminated immediately before or after the prespecified time period based on the duty cycle under which the illumination source 110 is operating. Temporarily de-illuminating the illumination source 110 is a deviation from the duty cycle of the illumination source 110; i.e., the illumination source 110 is put into an unilluminated condition even if the duty cycle indicates that the illumination source 110 should be illuminated.

The computer 120 may be programmed to store a most recent unilluminated image frame from the image data 400 in a buffer in the memory of the computer 120. The unilluminated image frame is captured when the illumination source 110 is unilluminated, in particular is the most recent frame of the image data 400 that was known to be captured while the the illumination source 110 was unilluminated. The most recent unilluminated image frame may be from temporarily de-illuminating the illumination source 110 or may be from the normally unilluminated frames of the duty cycle. The image data 400 may include one or more transitional frames between the most recent unilluminated image frame and the nearest later frame that is illuminated, particularly if the illumination source 110 is not synchronized with the camera 115. The transitional frames may not be reliably classified as illuminated or unilluminated.

The buffer may have enough capacity to store a small number of the most recent unilluminated image frames, e.g., one, to save memory space. The computer 120 may be programmed to, upon storing the most recent unilluminated image frame in the buffer, delete a previous most recent unilluminated image frame from the buffer, in order to keep the number of image frames in the buffer within the capacity of the buffer.

The computer 120 may be programmed to compensate for ambient illumination in an illuminated image frame from the image data 400 by using the most recent unilluminated image frame. For example, the most recent unilluminated image frame can be taken to indicate the ambient illumination. The computer 120 can subtract the intensity values for each pixel in the most recent unilluminated image frame from the intensity values of the respective pixels, i.e., the pixels with the same pixel coordinates, in the illuminated image frame. The resulting image is thereby an isolation of specular reflection from the illumination source 110. In other words, the value for a pixel at coordinates (x, y) in the resulting image is $I_{iso}(x, y)=I_{light}(x,y)-I_{dark}(x, y)$, in which $I_{iso}$ the intensity at a pixel in the resulting image, $I_{light}$ is the intensity at a pixel in the illuminated image frame, and $I_{dark}$ is the intensity at a pixel in the most recent unilluminated image frame.

The computer 120 may be programmed to, after compensating for ambient illumination, determine a characteristic of the object in the illuminated image frame. For example, determining the characteristic may include one or more of performing a biometric authentication such as facial recognition of the object, detecting a gaze direction of an object that is a face, detecting a material of the object, determining an emotional state indicated by an object that is a face, detecting a drowsiness level of an object that is a face, etc.

For example, the computer 120 may be programmed to perform biometric authentication of the object. For example, if the preset type of the object is a face, the computer 120 can perform facial recognition to determine whether the face is a recognized face, i.e., a face stored in memory of a known person such as an owner or operator of the vehicle 100. The computer 120 can use any suitable facial-recognition technique, e.g., template matching; statistical techniques such as principal component analysis (PCA), discrete cosine transform, linear discriminant analysis, locality preserving projections, Gabor wavelet, independent component analysis, or kernel PCA; neural networks such as neural networks with Gabor filters, neural networks with Markov models, or fuzzy neural networks; etc. Alternatively or additionally, the computer 120 may perform a biometric authentication of a different preset type of object, e.g., a retinal scan to determine whether a retina matches a retina stored in memory of a known person.

For another example, the computer 120 may be programmed to detect a gaze direction of an occupant of the vehicle 100, e.g., in one of the seats 210. The computer 120 can, first, detect the eyes using any suitable eye-detection algorithm, e.g., a shape-based technique using an elliptical eye model or a complex eye model; a feature-based technique such as detecting local features, detecting a filter response, or detecting the pupil and iris; an appearance-based technique; hybrid techniques of the foregoing; etc. The computer 120 can then detect the gaze direction of the detected eyes using any suitable gaze-tracking algorithm, e.g., model-based techniques, interpolation-based techniques, appearance-based techniques, visible light-based techniques, etc.

For another example, the computer 120 may be programmed to determine a specular reflectance of the object. The specular reflectance is a measure of the diffuseness of light reflected off of a surface. The specular reflectance may be used for preventing spoofing of a biometric authentication. For example, the specular reflectance of a face is different than the specular reflectance of a printed image showing a face, so the computer 120 may be programmed to prevent actuation of a component 130 triggered by biometric authentication in response to the specular reflectance being outside of a preset range. The preset range may be chosen to correspond to the typical range for a face.

Figure 5:
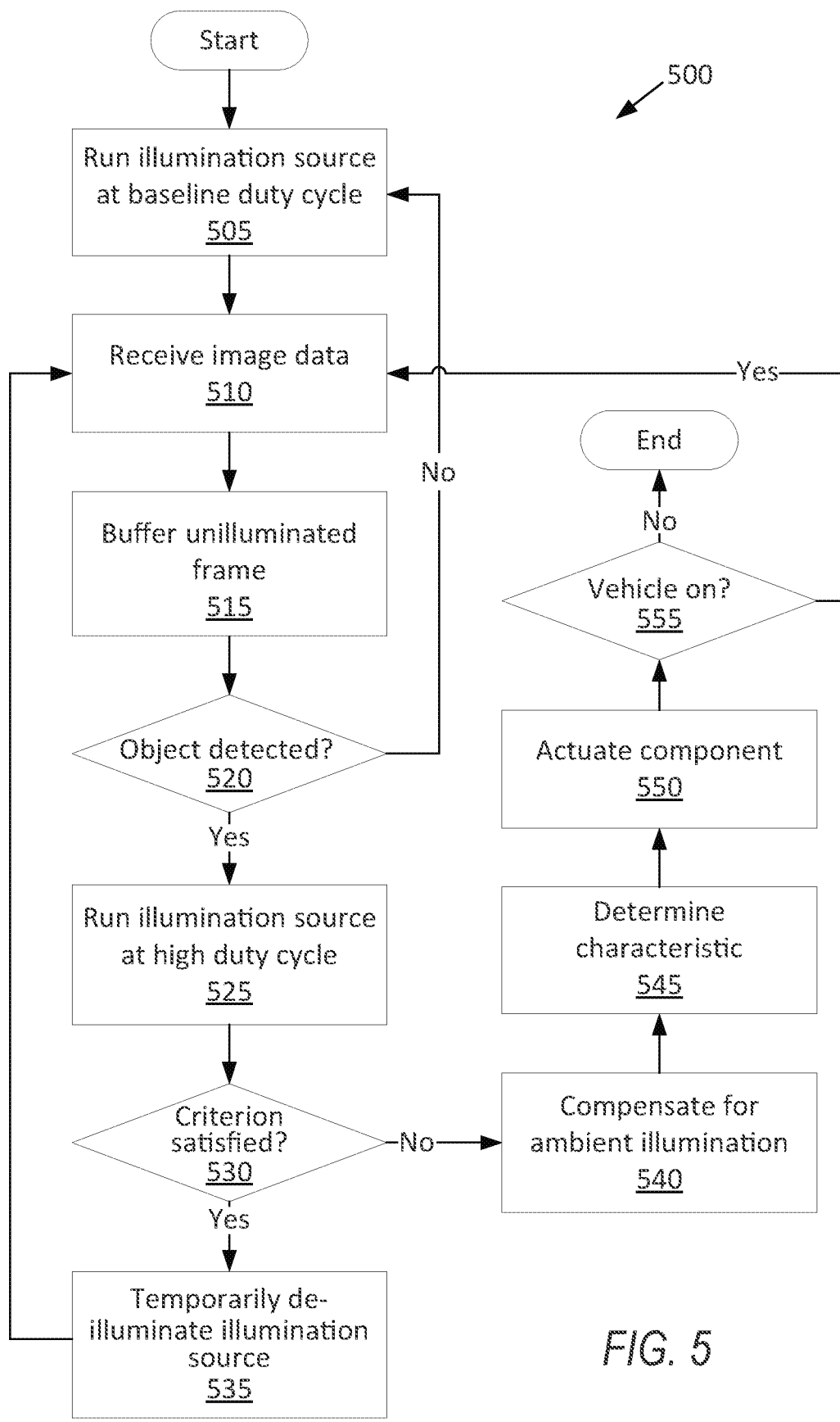
FIG. 5 is a process flow diagram of an example process for controlling the illumination sources of the vehicle.

FIG. 5 is a process flow diagram illustrating an example process 500 for controlling the illumination sources 110. The memory of the computer 120 stores executable instructions for performing the steps of the process 500 and/or programming can be implemented in structures such as mentioned above. The process 500 may be executed individually for each of the illumination sources 110. As a general overview of the process 500, the computer 120 starts by operating the illumination source 110 with the duty cycle at the baseline duty cycle 305. For as long the vehicle 100 remains on, the computer 120 repeatedly receives the image data 400, stores the most recent unilluminated image frame in the buffer, and determines whether an object of the preset type has been detected. If not, the computer 120 operates the illumination source 110 at the baseline duty cycle 305. If so, the computer 120 operates the illumination source 110 at the high duty cycle 310. If the criterion is satisfied, the computer 120 temporarily de-illuminates the illumination source 110. When the object of the preset type has been detected, the computer 120 compensates for the ambient illumination in an illuminated image frame, determines the characteristic of the object in the illuminated image frame, and actuates a component 130 based on the characteristic.

The process 500 begins in a block 505, in which the computer 120 operates the illumination source 110 with the duty cycle at the baseline duty cycle 305, as described above.

Next, in a block 510, the computer 120 receives the image data 400.

Next, in a block 515, the computer 120 stores the most recent unilluminated image frame from the image data 400 in the buffer and deletes a previous most recent unilluminated image frame from the buffer, as described above.

Next, in a decision block 520, the computer 120 determines whether the computer 120 has detected an object having the preset type in the image data 400. In response to failing to detect an object having the preset type in the image data 400, the process 500 returns to the block 505. In response to detecting an object having the preset type in the image data 400 from the camera 115, the process 500 proceeds to a block 525.

In the block 525, the computer 120 operates the illumination source 110 with the duty cycle at the high duty cycle 310, as described above.

Next, in a decision block 530, the computer 120 determines whether the image data 400 satisfies the criterion, as described above. If so, the process 500 proceeds to a block 535. If not, the process 500 proceeds to a block 540.

In the block 535, the computer 120 temporarily de-illuminates the illumination source 110, as described above. After the block 535, the process 500 returns to the block 510 to continue receiving the image data 400 covering the temporarily unilluminated period.

In the block 540, the computer 120 compensates for the ambient illumination in an illuminated image frame from the image data 400, as described above, by using the most recent unilluminated image frame stored to the buffer in the block 515.

Next, in a block 545, the computer 120 determines the characteristic of the object in the illuminated image frame, as described above.

Next, in a block 550, the computer 120 actuates at least one of the vehicle components 130 based on the image data 400 captured when the illumination source 110 is illuminated, i.e., based on the illuminated image frame, e.g., based on the characteristic determined in the block 545. The vehicle 100 may be stationary while the component 130 is actuated. For example, the computer 120 can instruct the door locks 205 to unlock. For another example, the computer 120 can adjust one of the seats 210 to a predetermined arrangement. The predetermined arrangement can be stored in memory paired with the recognized face. For another example, the computer 120 can activate the climate-control system 215.

Next, in a decision block 555, the computer 120 determines whether the vehicle 100 is still on. If so, the process 500 returns to the block 510 to continue receiving the image data 400 from the camera 115. If not, the process 500 ends.

In general, the computing systems and/or devices described may employ any of a number of computer operating systems, including, but by no means limited to, versions and/or varieties of the Ford Sync® application, AppLink/Smart Device Link middleware, the Microsoft Automotive® operating system, the Microsoft Windows® operating system, the Unix operating system (e.g., the Solaris® operating system distributed by Oracle Corporation of Redwood Shores, California), the AIX UNIX operating system distributed by International Business Machines of Armonk, New York, the Linux operating system, the Mac OSX and iOS operating systems distributed by Apple Inc. of Cupertino, California, the BlackBerry OS distributed by Blackberry, Ltd. of Waterloo, Canada, and the Android operating system developed by Google, Inc. and the Open Handset Alliance, or the QNX® CAR Platform for Infotainment offered by QNX Software Systems. Examples of computing devices include, without limitation, an on-board vehicle computer, a computer workstation, a server, a desktop, notebook, laptop, or handheld computer, or some other computing system and/or device.

Computing devices generally include computer-executable instructions, where the instructions may be executable by one or more computing devices such as those listed above. Computer executable instructions may be compiled or interpreted from computer programs created using a variety of programming languages and/or technologies, including, without limitation, and either alone or in combination, Java™, C, C++, Matlab, Simulink, Stateflow, Visual Basic, Java Script, Python, Perl, HTML, etc. Some of these applications may be compiled and executed on a virtual machine, such as the Java Virtual Machine, the Dalvik virtual machine, or the like. In general, a processor (e.g., a microprocessor) receives instructions, e.g., from a memory, a computer readable medium, etc., and executes these instructions, thereby performing one or more processes, including one or more of the processes described herein. Such instructions and other data may be stored and transmitted using a variety of computer readable media. A file in a computing device is generally a collection of data stored on a computer readable medium, such as a storage medium, a random access memory, etc.

A computer-readable medium (also referred to as a processor-readable medium) includes any non-transitory (e.g., tangible) medium that participates in providing data (e.g., instructions) that may be read by a computer (e.g., by a processor of a computer). Such a medium may take many forms, including, but not limited to, non-volatile media and volatile media. Instructions may be transmitted by one or more transmission media, including fiber optics, wires, wireless communication, including the internals that comprise a system bus coupled to a processor of a computer. Common forms of computer-readable media include, for example, RAM, a PROM, an EPROM, a FLASH-EEPROM, any other memory chip or cartridge, or any other medium from which a computer can read.

Databases, data repositories or other data stores described herein may include various kinds of mechanisms for storing, accessing, and retrieving various kinds of data, including a hierarchical database, a set of files in a file system, an application database in a proprietary format, a relational database management system (RDBMS), a nonrelational database (NoSQL), a graph database (GDB), etc. Each such data store is generally included within a computing device employing a computer operating system such as one of those mentioned above, and are accessed via a network in any one or more of a variety of manners. A file system may be accessible from a computer operating system, and may include files stored in various formats. An RDBMS generally employs the Structured Query Language (SQL) in addition to a language for creating, storing, editing, and executing stored procedures, such as the PL/SQL language mentioned above.

In some examples, system elements may be implemented as computer-readable instructions (e.g., software) on one or more computing devices (e.g., servers, personal computers, etc.), stored on computer readable media associated therewith (e.g., disks, memories, etc.). A computer program product may comprise such instructions stored on computer readable media for carrying out the functions described herein.

In the drawings, the same reference numbers indicate the same elements. Further, some or all of these elements could be changed. With regard to the media, processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted.

All terms used in the claims are intended to be given their plain and ordinary meanings as understood by those skilled in the art unless an explicit indication to the contrary in made herein. In particular, use of the singular articles such as "a," "the," "said," etc. should be read to recite one or more of the indicated elements unless a claim recites an explicit limitation to the contrary. The adjectives "first" and "second" are used throughout this document as identifiers and are not intended to signify importance, order, or quantity. Use of "in response to" and "upon determining" indicates a causal relationship, not merely a temporal relationship.

The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

The invention claimed is:

1. A system comprising:
    an illumination source operable at an adjustable duty cycle, the duty cycle indicating a proportion of time that the illumination source is illuminated in a repeating pattern;
    a camera arranged to detect illumination from the illumination source; and
    a computer communicatively coupled to the illumination source and the camera;
        wherein the computer is programmed to:
            operate the illumination source with the duty cycle at a baseline duty cycle in response to failing to detect an object having a preset type according to characteristics of the object in image data from the camera;
            operate the illumination source with the duty cycle at a high duty cycle in response to detecting the object having the preset type according to the characteristics of the object in the image data from the camera, the high duty cycle having the illumination source illuminated for a greater proportion of time than the baseline duty cycle;

store a most recent unilluminated image frame from the image data in a buffer, the most recent unilluminated image frame being captured when the illumination source is unilluminated; and compensate for ambient illumination in an illuminated image frame from the image data by using the most recent unilluminated image frame.

2. The system of claim 1, wherein the illumination source is configured to produce illumination outside a visible range.

3. The system of claim 2, wherein the illumination source is configured to produce infrared illumination.

4. The system of claim 1, further comprising a component communicatively coupled to the computer, wherein the computer is further programmed to actuate the component based on the image data captured when the illumination source is illuminated.

5. A computer comprising a processor and a memory, the memory storing instructions executable by the processor to:

operate an illumination source with a duty cycle at a baseline duty cycle in response to failing to detect an object having a preset type according to characteristics of the object in image data from a camera, the duty cycle indicating a proportion of time that the illumination source is illuminated in a repeating pattern, the camera arranged to detect illumination from the illumination source;

operate the illumination source with the duty cycle at a high duty cycle in response to detecting the object having the preset type according to the characteristics of the object in the image data from the camera, the high duty cycle having the illumination source illuminated for a greater proportion of time than the baseline duty cycle;

store a most recent unilluminated image frame from the image data in a buffer, the most recent unilluminated image frame being captured when the illumination source is unilluminated; and compensate for ambient illumination in an illuminated image frame from the image data by using the most recent unilluminated image frame.

6. The computer of claim 5, wherein the preset type is a face.

7. The computer of claim 5, wherein the instructions further include instructions to, after compensating for the ambient illumination, determine a characteristic of the object in the illuminated image frame.

8. The computer of claim 7, wherein determining the characteristic includes performing a biometric authentication of the object.

9. The computer of claim 7, wherein determining the characteristic includes detecting a gaze direction.

10. The computer of claim 7, wherein the instructions further include instructions to actuate a component based on the characteristic.

11. The computer of claim 10, wherein the component is a vehicle component of a vehicle including the computer.

12. The computer of claim 5, wherein the instructions further include instructions to retain a previous most recent unilluminated image frame in the buffer until receiving the most recent unilluminated image frame, and, upon storing the most recent unilluminated image frame in the buffer, delete the previous most recent unilluminated image frame from the buffer.

13. The computer of claim 5, wherein the instructions further include instructions to, in response to the image data satisfying a criterion, temporarily de-illuminate the illumination source.

14. The computer of claim 13, wherein temporarily de-illuminating the illumination source is a deviation from the duty cycle of the illumination source.

15. The computer of claim 13, wherein the criterion includes a change in average brightness of the image data greater than a threshold.

16. The computer of claim 13, wherein the object is a first object, and the criterion includes detecting a second object of the preset type.

17. The computer of claim 13, wherein the most recent unilluminated image frame is captured when temporarily de-illuminating the illumination source.

18. A method comprising:

operating an illumination source with a duty cycle at a baseline duty cycle in response to failing to detect an object having a preset type according to characteristics of the object in image data from a camera, the duty cycle indicating a proportion of time that the illumination source is illuminated in a repeating pattern, the camera arranged to detect illumination from the illumination source;

operating the illumination source with the duty cycle at a high duty cycle in response to detecting the object having the preset type according to the characteristics of the object in the image data from the camera, the high duty cycle having the illumination source illuminated for a greater proportion of time than the baseline duty cycle;

storing a most recent unilluminated image frame from the image data in a buffer, the most recent unilluminated image frame being captured when the illumination source is unilluminated; and compensating for ambient illumination in an illuminated image frame from the image data by using the most recent unilluminated image frame.

* * * * *